United States Patent [19]

Rupaner et al.

[11] Patent Number: 5,356,968

[45] Date of Patent: Oct. 18, 1994

[54] COATING AGENTS

[75] Inventors: Robert Rupaner, Ludwigshafen; Michael W. Mueller, Plankstadt; Maximilian Angel, Schifferstadt; Klaus Boehlke, Hessheim, all of Fed. Rep. of Germany

[73] Assignee: BASF Aktiengesellschaft, Ludwigshafen, Fed. Rep. of Germany

[21] Appl. No.: 3,436

[22] Filed: Jan. 12, 1993

[30] Foreign Application Priority Data

Jan. 28, 1992 [DE] Fed. Rep. of Germany ... 4202301

[51] Int. Cl.$^5$ .............................. C08K 5/41
[52] U.S. Cl. ........................ 524/157; 524/458; 524/460; 524/748
[58] Field of Search .......... 524/157, 458, 460, 748

[56] References Cited

U.S. PATENT DOCUMENTS

| | | | |
|---|---|---|---|
| 3,202,638 | 8/1965 | Van Ess | 524/747 |
| 3,329,640 | 7/1967 | Scotti et al. | 524/748 |
| 4,046,726 | 9/1977 | Meiner et al. | 524/561 |

FOREIGN PATENT DOCUMENTS 0006547 1/1980 European Pat. Off. .
0047889 3/1982 European Pat. Off. .

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

A coating agent comprises an emulsion polymer obtained by free radical emulsion polymerization of a monomer mixture of A) from 15 to 60% by weight of an acrylic or methacrylic ester having a primary or secondary $C_1$–$C_{18}$-alkyl group, as alcohol radical, B) from 15 to 50% by weight of an acrylic or methacrylic ester having tertiary $C_4$–$C_8$-alkyl group or a $C_6$–$C_{12}$-radical that is an alicyclic or aromatic group as alcohol group a methacrylic ester having a primary or secondary $C_2$–$C_4$-alkyl group as alcohol radical, acrylo- or methacrylonitrile, acryl- or meth-acrylamide, a vinyl ester of a $C_1$–$C_8$- carboxylic acid, C) from 10 to 50% by weight of one or more $C_8$–$C_{12}$-aromatic vinyl compounds, D) from 8 to 20% by weight of an olefinically unsaturated $C_3$–$C_5$-mono- or $C_4$–$C_8$-dicarboxylic acid or anhydride, and E) from 0 to 5% by weight of further copolymerizable monomers having functional groups in the presence of from 0.1 to 10% by weight, based on the monomer mixture of A to E, of an emulsifier mixture of (a) one or more anionic emulsified of formula I where

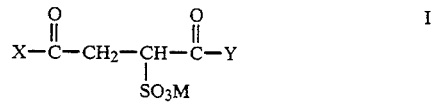

M is an alkali metal or ammonium and X and Y are identical or different and each is $O-(C_nH_{2n}O)_m-R$, OM or NHR, wherein at least one of the radicals X and Y is $O-(C_nH_{2n}O)_m-R$ or NHR, and (b) from 0.1 to 10 parts by weight per part by weight of (a) of at least one further different anionic emulsifier.

9 Claims, No Drawings

COATING AGENTS

The present invention relates to novel coating agents comprising an emulsion polymer obtainable by free radical emulsion polymerization of a specific monomer mixture in the presence of an emulsifier mixture of sulfosuccinic acid derivatives, further anionic emulsifiers and if desired nonionic emulsifiers. The present invention also relates to smooth leveling coating agent formulations for coating hard and soft surfaces, in particular to dry-bright emulsions for floor and shoe care that contain these coating agents.

Coating agents and coating agent formulations specifically for hard surfaces, in particular for floor care, must satisfy a whole number of different requirements. The polymer dispersions used must be low in coagulum and be shear stable. The coating agent formulations must dry to form hard, glossy and polishable films which last for a long time and are resistant to soiling. They should be impervious to detergents, water and organic solvents. The films should be colorless and must in particular not be tacky. The coatings obtained should be uniform and non-stripe; that is, the coating agent formulations must be smooth leveling. Finally, the films should also be readily removable again in order that a fresh coating may be produced.

The functions of such coating agents accordingly go far beyond the application profile customarily associated with the term "care"; that is, they should do more than just confer a cared-for appearance and gloss on the surfaces in question. In the broader sense they accordingly also confer a form of protection which extends the useful life of the treated assets and hence pushes the date for renewal of these assets into the future. Floor coverings are in general predominantly made of polyvinyl chloride (PC) and extending the useful life thereof leads to a reduction in the chlorine-containing materials to be disposed of and hence to less environmental pollution.

Preservation and disinfection are increasingly important aspects of such products. Dirt is a nutrient base for microorganisms of any kind. When floor coverings are cleaned, the removal of dirt also removes the bulk of the microorganisms and, as the film is formed, prevents further access to the substrate. Consequently, such cleaning and care agents make a contribution to hygiene and health. Furthermore coating agent formulations should be free of flow control agents, for example partially or completely fluoridated surfactants, and of crosslinking components such as zinc compounds.

U.S. Pat. No. 4,046,726 (1) concerns water insoluble zinc-containing emulsion polymers of styrene or styrene derivatives and other copolymerizable monomers such as methyl methacrylate, n-butyl acrylate and methacrylic acid. These emulsion polymers are suitable for use as coating agents in floor care compositions. The emulsifiers mentioned are the most widely used representatives of anionic and nonionic surfactants, including for example fluorinated surfactants and also dialkyl succinates. However, a mixture of surface-active succinic acid derivatives and further anionic surfactants is not recommended.

EP-A-047 889 (2) discloses alkali-soluble resins based on copolymers of monoolefinically unsaturated carboxylic acids and aromatically substituted α-olefins and the use thereof as resin component in polymer dispersions for dry-bright emulsions for coating, for example floors. The flow control agents recommended for the dry-bright emulsions are fluorinated surfactants.

EP-A-006 547 (3) concerns aqueous dispersions of copolymers crosslinked with metal ions such as zinc. The dispersions described are suitable for use as floor polishes.

However, the prior art agents still have a number of disadvantages, since they do not fully meet certain requirements.

It is an object of the present invention to provide coating agents or coating agent formulations which are free of the prior art disadvantages and which in particular exhibit lower surface tackiness and smoother leveling while being substantially free of flow promoting additives, for example partially fluorinated or perfluorinated surfactants or silicone surfactants, and of zinc compounds.

We have found that this object is achieved by a coating agent comprising an emulsion polymer obtainable by free radical emulsion polymerization of a monomer mixture of A) from 15 to 60% by weight of an acrylic ester having a primary or secondary $C_1$–$C_{18}$-alkyl group, which may be interrupted by oxygen atoms, as alcohol radical (monomer I), a methacrylic ester having a primary or secondary $C_5$–$C_{18}$-alkyl group, which may be interrupted by oxygen atoms, as alcohol radical (monomer II), or a mixture thereof, B) from 15 to 50% by weight of an acrylic or methacrylic ester having a tertiary $C_4$–$C_8$-alkyl group as alcohol radical (monomer III), an acrylic or methacrylic ester having a $C_6$–$C_{12}$-alcohol radical that is an alcyclic or aromatic group or contains an alicyclic or aromatic group (monomer IV), a methacrylic ester having a primary or secondary $C_1$–$C_4$-alkyl group as alcohol radical (monomer V), acrylo- or methacrylonitrile (monomer VI), acryl- or methacrylamide (monomer VII), a vinyl ester of a $C_1$–$C_8$-carboxylic acid (monomer VIII) or a mixture thereof, C) from 10 to 50% by weight of one or more $C_8$–$C_{12}$-aromatic vinyl compounds (monomer IX), D) from 8 to 20% by weight of an olefinically unsaturated $C_3$–$C_5$-mono- or $C_4$–$C_8$-dicarboxylic acid or anhydride (monomer X) or a mixture thereof, and E) from 0 to 5% by weight of further copolymerizable monomers having functional groups (monomers XI) in the presence of from 0.1 to 10% by weight, based on the monomer mixture of A to E, of an emulsifier mixture of (a) one or more sulfosuccinic acid derivatives of the general formula I

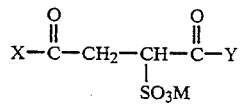

$$X-\overset{O}{\underset{\|}{C}}-CH_2-\underset{\underset{SO_3M}{|}}{CH}-\overset{O}{\underset{\|}{C}}-Y \qquad \text{I}$$

where

M is an alkali metal or ammonium which may be substituted by from one to four $C_1$–$C_4$-alkyl or $C_1$–$C_4$-hydroxyalkyl groups, and X and Y are identical or different and each is $O-(C_nH_{2n}O)_m-R$, OM or NHR, wherein at least one of the radicals X and Y is $O-(C_nH_{2n}O)_m-R$ or NHR, R is $C_6$–$C_{18}$-alkyl, $C_6$–$C_{18}$-alkenyl, $C_5$–$C_8$-cycloalkyl, ($C_1$–$C_{12}$-alkyl)aryl or phenyl, n is from 2 to 4, and m is from 0 to 30, (b) from 0.1 to 10 parts by weight per part by weight of (a) of at least one further anionic emulsifier, and (c) from 0 to 10 parts by weight per part by weight of (a) of one or more nonionic emulsifiers.

The emulsion polymer is composed of various monomers, namely "softening" monomers A, "hardening" monomers B, "hydrophobic" monomers C, acid-containing monomers D and if desired functionalized monomers E; the last-mentioned kind of monomers are designed to modify the emulsion polymer to a minor extent as required—for example by crosslinking—without, however, affecting the basic properties.

As used herein the terms "hardening" and "softening" monomers are to be understood as meaning that the addition of monomers so referred to respectively raises or lowers the modulus of elasticity and the glass transition temperature of the polymer. "Hydrophobic" indicates that the corresponding homopolymers are less water-swellable than the homopolymers of the other monomers and that the copolymerization of the monomers so referred to is intended to counteract the marked swellability conferred on the polymer by the presence of acid-containing and very hydrophilic monomers. "Hardening" and "softening" monomers are used in a balanced ratio to obtain the desired glass transition temperature and in particular the desired minimum film forming temperature.

Suitable monomers I are in particular methyl acrylate, ethyl acrylate, n-propyl acrylate, isopropyl acrylate, n-butyl acrylate, isobutyl acrylate, sec-butyl acrylate, n-amyl acrylate, isoamyl acrylate, n-hexyl acrylate, 2-ethylhexyl acrylate, n-octyl acrylate, 3,5,5-trimethylhexyl acrylate, n-decyl acrylate, n-dodecyl acrylate, isotridecyl acrylate, cetyl acrylate, octadecyl acrylate and n-butoxyethyl acrylate. Of these, n-butyl acrylate is particularly suitable.

Suitable monomers II are in particular n-amyl methacrylate, isoamyl methacrylate, n-hexyl methacrylate, 2-ethylbutyl methacrylate, 2-ethylhexyl methacrylate, n-octyl methacrylate, 3,5,5-trimethylhexyl methacrylate, n-decyl methacrylate, n-dodecyl methacrylate, isotridecyl methacrylate, octadecyl methacrylate and butoxyethyl methacrylate.

Suitable monomers III are in particular tert-butyl acrylate or methacrylate, tert-amyl acrylate or methacrylate, 1,1-dimethylbutyl acrylate or methacrylate and 1,1-dimethylhexyl acrylate or methacrylate.

Suitable monomers IV are in particular isobornyl acrylate or methacrylate, cyclohexyl acrylate or methacrylate, benzyl acrylate or methacrylate, and phenyl acrylate or methacrylate.

Suitable monomers V are in particular methyl methacrylate, but also ethyl methacrylate, n-propyl methacrylate, isopropyl methacrylate, n-butyl methacrylate, isobutyl methacrylate and sec-butyl methacrylate.

Suitable monomers VIII are in particular vinyl formate, vinyl acetate, vinyl propionate, vinyl butyrate, vinyl hexanoate, vinyl octanoate and vinyl 2-ethylhexanoate.

Suitable monomers IX are in particular styrene, α-methylstyrene, 2-, 3- or 4-vinyltoluene, 2,4-dimethylstyrene and 1-phenylpropene. Of these, styrene is particularly suitable.

Suitable monomers X are in particular acrylic acid, methacrylic acid, crotonic acid, itaconic acid, citraconic acid, fumaric acid, maleic acid and maleic anhydride. Of these, acrylic acid and methacrylic acid are particularly suitable.

If desired, further functionalized monomers XI may be used, for example in order to obtain crosslinking in the polymer or in the course of film formation therefrom or else only to obtain improved adhesion to a substrate. Examples of such usually hydrophilic substances which, in addition to a radical polymerizable double bond, have at least one further functional group are monomers with amido groups, including N-substituted derivatives, such as alkoxyalkylamido- and alkylolamido(meth)acrylates, (meth)acrylamidoglycolic acid and esters and/or ethers thereof, with further olefinic double bonds, for example divinylbenzene, butanediol di(meth)acrylate or (meth)allyl (meth)acrylate, and with hydroxyl, amino, epoxy, oxazolinidyl, oxazinyl or ureido groups in the side chain.

A preferred embodiment comprises using a monomer mixture of

A) from 10 to 60% by weight of n-butyl acrylate,

B) from 15 to 50% by weight of methyl methacrylate,

C) from 10 to 50% by weight of styrene,

D) from 8 to 20% by weight of acrylic acid, methacrylic acid or a mixture thereof, and from 0 to 5% by weight of further copolymerizable monomers having functional groups.

The monomer components A to E are preferably used in a weight ratio of from 20 to 50% by weight of A, from 20 to 45% by weight of B, from 15 to 45% by weight of C, from 10 to 18% by weight of D and from 0 to 3% by weight of E, in particular in the weight ratio of from 23 to 43% by weight of A, from 25 to 40% by weight of B, from 20 to 40% by weight of C, from 12 to 15% by weight of D and from 0 to 2% by weight of E.

In the emulsifier component (a) of the general formula I, the cation M is preferably ammonium, potassium or in particular sodium, but may also be lithium, trimethylammonium, triethylammonium, tri-n-butylammonium, tetra-n-butylammonium, triethanolammonium or triisopropanolammonium.

The radical R in the general formula I is in particular n-hexyl, n-octyl, 2-ethylhexyl, n-nonyl, 3,5,5-trimethylhexyl, n-decyl, n-dodecyl, n-tridecyl, isotridecyl, tetradecyl, cetyl, stearyl (octadecyl), oleyl, cyclohexyl, methylcyclohexyl, o-, m- or p-tolyl, $C_5$–$C_{12}$-alkylphenyl such as (2-ethylhexyl)phenyl, n-octylphenyl, n-nonylphenyl, isononylphenyl, n-decylphenyl or n-dodecylphenyl or unsubstituted phenyl.

If the compounds I contain alkylene oxide units, n is preferably 2 (ethylene oxide) or 3 (propylene oxide) but may also be 4 (burylena oxide). The degree of alkoxylation m is preferably from 0 to 15, in particular from 0 to 7. Preferably, however, the compounds I contain no alkylene oxide units (m=0).

In a preferred embodiment, the emulsifier component (a) is the alkali metal salt of a di($C_6$–$C_{18}$-alkyl) α-sulfosuccinate or the dialkali metal salt of an N—($C_6$–$C_{18}$-alkyl)sulfosuccinamate (N-alkyl derivative of a monoamide of sulfosuccinic acid).

Suitable emulsifier components (b) are in particular alkali metal or ammonium salts of $C_6$–$C_{18}$-alkyl, ($C_6$–$C_{18}$-alkyl)aryl or α-methyl ester sulfonates, sulfates or polyether sulfates and the corresponding phosphonates or phosphates or $C_6$–$C_{18}$-alkyl diphenyl oxide disulfonates or mixtures thereof. The term polyether sulfates covers the known sulfated derivatives of the addition products of alcohols or phenols with ethylene oxide, propylene oxide or butylene oxide, for which a degree of addition of up to 50 units, in particular up to 30 units, is customary.

Particularly preferred emulsifier components (b) are ethoxylated alkali metal $C_8$-$C_{18}$-alkyl ether sulfates, for example sodium lauryl ether sulfate. The degree of ethoxylation selected here is low, for example within the range from 1 to 7, in particular from 2 to 4. Furthermore, $C_{10}$-$C_{14}$-fatty alcohol derivatives are preferred.

Particularly preferred emulsifiers (b) also include those systems which have advantages from ecological aspects, ie. explicitly emulsifiers which have no branched carbon chains and hence are readily eliminable or biodegradable (in particular fatty alcohol derivatives), which are not based on the ethoxylated phenols, whose metabolites are considered piscotoxic, and which have not been preserved with formaldehyde or give off formaldehyde on polymerization.

The optional emulsifier component (c) can be in particular ethoxylated $C_8$-$C_{18}$-fatty acids, $C_8$-$C_{18}$-fatty alcohols, $C_8$-$C_{18}$-fattyamines, $C_8$-$C_{18}$-fatty acidamides, $C_6$-$C_{18}$-alkylphenols, ethylene oxide-propylene oxide block copolymers, $C_6$-$C_{18}$-alkyl(poly)glycosides or mixtures thereof.

The emulsifier mixture of (a), (b) and (c) is used in an amount of preferably 0.5–7% by weight, in particular 1–5% by weight, based on the monomer mixture of A to E. The mixture of the individual emulsifier components preferably contains 0.3 to 3 parts by weight of (b) per part by weight of (a), in particular from 0.5 to 2 parts by weight of (b) per part by weight of (a). Very particular preference is given to a weight ratio of about 1:1 between the emulsifiers (a) and (b) in a total amount of from 2 to 4% by weight, because the polymer dispersions obtained have average particle sizes within the preferable range from 60 to 100 nm, in particular around 80 nm, and a light transmissivity of above 90%.

The total amount of emulsifier mixture used depends on the size desired for the polymer particles. The emulsifier mixture can be added to the monomer feed stream all at once. However, to control the number of particles and hence the size of the corresponding polymer particles, it is preferable for the emulsifier quantity to be divided into an amount which is introduced with the initial charge and an amount which is added with the monomer emulsion. The quantity specified herein is to be understood as meaning the sum total of all emulsifier and is freely deployable in the initial charge, in the monomer stream or, if necessary, to effect subsequent stabilization.

The emulsion polymers described are prepared in the form of aqueous dispersions in a conventional manner by emulsion polymerization in an aqueous medium in the presence of a free radical oxygen- or nitrogen-containing initiator. Initiators of this type are generally known and can be inorganic or organic. They are thermally decomposed or combined with reducing agents and used as redox initiators. The former category comprises in particular persulfates, alkali metal peroxides or hydrogen peroxide, while the latter category includes for example tert-butyl hydroperoxide, benzoyl peroxide or azoisobutyronitrile. A suitable reducing agent is ascorbic acid in the presence of small amounts of iron(II) salts, sodium sulfoxylate or potassium hydrogensulfite.

However, of particular suitability for preparing finely divided dispersions are alkali metal salts or the ammonium salt of peroxodisulfuric acid, for example sodium peroxodisulfate, which in general is used in amounts of about 1–3% by weight, based on the total amount of monomer. The temperature at which the polymerization is carried out should be within the range from 60° to 95° C., particularly preferably within the range from 80° to 90° C. The use of relatively large amounts of free radical initiator leads to very shear-stable dispersions which show only a small increase in viscosity at about pH 7–10 despite the high level of acid-containing monomer D.

The emulsion polymerization is for the simplicity of the control and monitoring of the reaction advantageously carried out with the continuous addition to the ongoing polymerization in a reaction vessel of a monomer emulsion and separately therefrom of an initiator solution. Here it is possible by adding different monomer emulsion aliquots at different times to build up the polymer deliberately with a multi-shell structure, but preference is given to the continuous addition of a single monomer emulsion which contains all the polymerizable monomers. A high proportion of readily water-soluble monomers leads to hydrophilic oligomers and polymers, which are adsorbed or grafted onto latex particles and hence become concentrated in the outer layer of the latex particles and bring about a heterogeneous particle morphology. This effect can be enhanced by using partially neutralized monomer emulsions.

The monomer emulsion consists of a mixture of different monomers, water and an emulsifier system which according to the invention represents a mixture of a plurality of surfactants and also guarantees the stability of the emulsion. The monomer mixture is chosen in such a way that the nonplasticized polymer obtained after the polymerization, drying at room temperature and film formation has a glass transition temperature and a minimum film-forming temperature of in each case about 30°–100° C., preferably 40°–80° C., in particular 50°–70° C., and contains a sufficient number of carboxylate groups to exhibit firm adhesion to the substrate.

In the emulsion polymerization the ratio of monomer to water is set in such a way that the polymerization product obtained has solids contents of about 10–60% by weight, preferably about 25–50% by weight.

The present invention also provides a process for preparing an emulsion polymer suitable for use as coating agent, which comprises subjecting a monomer mixture of A) from 15 to 60% by weight of an acrylic ester having a primary or secondary $C_1$-$C_{18}$-alkyl group, which may be interrupted by oxygen atoms, as alcohol radical (monomer I), a methacrylic ester having a primary or secondary $C_5$-$C_{18}$-alkyl group, which may be interrupted by oxygen atoms, as alcohol radical (monomer II), or a mixture thereof, B) from 15 to 50% by weight of an acrylic or methacrylic ester having a tertiary $C_4$-$C_8$-alkyl group as alcohol radical (monomer III), an acrylic or methacrylic ester having a $C_6$-$C_{12}$-alcohol radical that is an alicyclic or aromatic group or contains an alicyclic or aromatic group (monomer IV), a methacrylic ester having a primary or secondary $C_1$-$C_4$-alkyl group as alcohol radical (monomer V), acrylo- or methacrylonitrile (monomer VI), acryl- or methacrylamide (monomer VII), a vinyl ester of a $C_1$-$C_8$-carboxylic acid (monomer VIII ) or a mixture thereof, C) from 10 to 50% by weight of one or more $C_8$-$C_{12}$-aromatic vinyl compounds (monomer IX), D) from 8 to 20% by weight of an olefinically unsaturated $C_3$-$C_5$-mono- or $C_4$-$C_8$-dicarboxylic acid or anhydride (monomer X) or a mixture thereof, and E) from 0 to 5% by weight of further copolymerizable monomers having functional groups (monomers XI) to a free radical polymerization in the presence of from 0.1 to 10% by weight, based on the monomer mixture of A to E, of an emulsifier mixture of (a) one or more sulfosuccinic acid derivatives of the general formula I

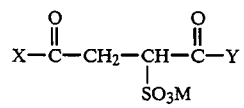

where

M is an alkali metal or ammonium which may be substituted by from one to four $C_1$-$C_4$-alkyl or $C_1$-$C_4$-hydroxyalkyl groups, and X and Y are identical or different and each is $O-(C_nH_{2n}O)_m-R$, OM or NHR, wherein at least one of the radicals X and Y is $O-(C_nH_{2n}O)_m-R$ or NHR, R is $C_6$-$C_{18}$-alkyl, $C_6$-$C_{18}$-alkenyl, $C_5$-$C_8$-cycloalkyl, ($C_1$-$C_{12}$-alkyl)aryl or phenyl, n is from 2 to 4, and m is from 0 to 30, (b) from 0.1 to 10 parts by weight per part by weight of (a) of at least one further anionic emulsifier, and (c) from 0 to 10 parts by weight per part by weight of (a) of one or more nonionic emulsifiers.

The present invention also provides a smooth leveling coating agent formulation for coating hard surfaces, containing, in addition to customary constituents for this purpose, from 1 to 50% by weight, preferably from 2 to 30% by weight, in particular from 5 to 25% by weight, based on the polymer content, of one or more coating agents according to the invention.

The coating formulations of the invention are highly suitable for use as dry-bright emulsions for floor care, chiefly for floors made of polyvinyl chloride, linoleum, rubber, parquet or stone. However, they are also advantageous for coating other hard surfaces, including in general plastics surfaces and plastics films, wood, ceramic surfaces such as tiles, stone surfaces, metal surfaces and related materials. They are particularly widely usable in the building sector, for example on bricks, stones, masonry, cement or concrete surfaces. The hard surfaces are preferably smooth but may also be rough and porous.

The coating agent formulations of the invention are also advantageous for coating soft surfaces for care purposes. These surfaces include in particular leather and leather substitutes in shoes.

Coating agent formulations for the purposes of the present invention are the ready-to-use, customarily aqueous, mixtures which already contain the customary aids and additives. "Coating agents", by contrast, refers either to the emulsion polymers themselves, which constitute the main ingredient or the active ingredient of coating agent formulations, or to aqueous dispersions of these emulsion polymers, which may already contain some of the aids and additives required for later application as a coating.

Using the above-described polymer dispersions it is possible to prepare coating agent formulations which are already known in the basic recipe and customarily have the following composition:

from 2 to 70% by weight of the emulsion polymer dispersion
from 1 to 40% by weight of a wax dispersion
from 0 to 40% by weight of an alkali soluble resin
from 0 to 10% by weight of a temporary plasticizer
from 0 to 5% by weight of a permanent plasticizer
from 0 to 1% by weight of a flow control agent.

In addition, depending on what they are to be used for and how they are to be applied, coating agent formulations may also contain small amounts of:
preservatives and stabilizers
scents or perfume
dyes and/or pigments
foam regulators
metal ions, added in the form of soluble or solubilizable salts or complexes.

The formulations are customarily adjusted with aqueous ammonia to a pH of from 6 to 10, in particular from 7 to 9. The total solids content is in general about 1–50% by weight, in particular about 15–20% by weight.

The wax is in general added to the formulation as a separately prepared emulsion. The coating agent formulations of the invention are particularly preferably prepared with oxygen containing polyethylene waxes having an average molecular weight of about 8,000 g/mol (viscosimetric number average), a melt viscosity of about 4,500 mm²/s (at 140° C.) and an average softening temperature of from 125° to 135° C. (DSC). Such wax emulsions can be prepared using any desired anionic or nonionic dispersant, have a polymer content of about 30–40% by weight and a pH of from 8 to 10, and are added to the formulation in an amount of less than 35% by weight, preferably in an amount of from 5 to 15% by weight. An example of an oxygen-containing polyethylene wax dispersion suitable for the coating agent formulations of the invention is Poligen ® WE1 (BASF).

It may also turn out to be necessary to add an alkali soluble resin. These usually acid-containing resins may if desired also be used in a partially neutralized form.

Examples of such alkali soluble resins are schellac, Manila gum, Loba gum and alkali soluble alkyd resins which essentially represent polyesters of aliphatic dicarboxylic acids with aliphatic polyhydric alcohols, which may be modified with a $C_8$-$C_{18}$-fatty acid, glycerol esters of $C_8$-$C_{18}$-fatty acids and resin acids, for example abietic acid or rosin. But it is particularly advantageous to use addition copolymers of olefinically unsaturated acids and aromatic vinyl compounds, for example copolymers of acrylic acid, methacrylic acid and/or maleic anhydride with styrene.

The aqueous formulations may contain up to approximately 75% by weight (based on the amount of emulsion polymer) of a plasticizer if a low film-forming temperature is necessary or advantageous for a particular purpose. From 15 to 55% by weight (based on the amount of emulsion polymer) of plasticizer are particularly suitable. Since the usual purpose of the plasticizer is to facilitate film formation and it is not always necessary to flexibilize the copolymer preparation if it is already tough and flexible without a plasticizer, it is sometimes preferable to use a volatile or semivolatile (temporary) plasticizer instead of a permanent plasticizer. However, it is also possible to use permanent plasticizers without running the risk of obtaining films having a poor abrasion resistance or a poor water resistance, since the amount of incorporated plasticizer is in most cases relatively low and in general not above 30% by weight (based on the emulsion polymers). Mixtures of volatile and permanent plasticizers can likewise be used. The plasticizer or plasticizer mixture used in a particular case and the amount of plasticizer added are chosen according to compatibility and with regard to effectiveness in lowering the film-forming temperature.

Examples of volatile plasticizers are the monomethyl, monoethyl and monobutyl ethers of diethylene glycol, triethylene glycol, dipropylene glycol and tripropylene glycol and also benzyl alcohol, isophorone and methoxybutanol. Examples of permanent plasticizers are pure or mixed diesters of phthalic acid with benzyl alcohol, butanol, hexanol, 2-ethylhexanol, cyclohexanol or octanol as alcohol component, pure or mixed benzoic and fatty esters of monohydric or polyhydric alcohols such as pentaerythritol, glycols and propylene glycols. Examples are polypropylene glycol adipate benzoate, diethylene glycol dibenzoate, dibenzyl sebacate, acetyl tributyl citrate and butyl phthalate-butyl glycolate. A structurally different group are triphenyl phosphate, tributyl phosphate and tributoxyethyl phosphate. Tributoxyethyl phosphate is frequently also used as flow control agent.

Since the coating agent formulations of the invention are in general of themselves smooth or very smooth leveling, it is in most cases possible to dispense with any flow control aid or a flow promoter.

The formulations of the invention may additionally contain divalent metal ions in the form of oxides, hydroxides, basic salts or soluble complexes, for example in order to achieve a crosslinking effect. These metal ions are in particular calcium, magnesium or zinc ions.

The formulations of the invention are primarily suitable for producing clear and glossy films or coatings. If desired, however, it is also possible to achieve a dull or colored appearance, namely by using delusterants, water or oil-soluble dyes, pigments or fillers, which will be sufficiently familiar to those versed in the art.

Coating agent formulations of the invention have a long storage life at normal temperatures. At lower temperatures, specifically at below the freezing point of water, the added temporary plasticizers also act as antifreezes, although if necessary the level thereof may be increased or polyhydric alcohols added.

The emulsion polymer, the wax and, if necessary, the alkali-soluble resin can be mixed in any desired order. It is preferable to add the wax as a dispersion to the emulsion polymer and then, if necessary, to mix in the alkali-soluble resin.

The ready-to-use formulation can be applied and spread in any conventional manner by means of wipes and mops or specific coating machines by brushing, daubing or sponging or else by dipping or spraying. It dries rapidly at room temperature as a clear film or as a colored film, if colored or pigmented beforehand, and in either case the film is hard, tough and tack-free. As the film ages it does not in general discolor. Applying the preparation to surfaces which already carry previously applied coatings of alkali-removable preparations does not result in the removal of marked amounts of such coatings. Nor is the viscosity or consistency of the formulations of the invention affected in an adverse manner. The preparations form even and stripe-free films on the surface, free of any nonuniformities. Coatings applied using the preparations of the invention are in most cases removable with dilute aqueous alkali.

The emulsion polymerization described results in polymer dispersions with a lower coagulum content and a higher shear stability and in coatings with a lower surface tackiness than polymer dispersions prepared using sulfosuccinates alone. The use of sulfosuccinates during the polymerization confers improved leveling on the coating agents. The second anionic emulsifier has a synergistic effect in that the dispersions obtained are more stable and result in less tacky coating agents but also confer smooth leveling characteristics thereon.

A high surface tackiness results in increased soiling. To obtain more soil-resistant and harder, ie. more wear resistant, coatings that are readily removable again with alkaline cleaners, it is customary to add metal salts, in particular zinc salts. The polymer dispersions described are additionally stabilized by the high level of copolymerized acid and the high amount of initiator used for preparing them and lead to coating agents having a suitable minimum film-forming temperature and hardness, so that it is therefore largely possible to dispense with the addition of metal salts. The high acid content, moreover, makes it possible to use alkaline cleaners to achieve incipient solution and redispersal, ie. removal, of the coating.

A further advantage of the coating agent formulations of the invention is that flow control agents, for example partially fluorinated or perfluorinated surfactants or silicone surfactants, can be dispensed with in preparing the coating agent formulations. The coating agent formulations of the invention are nonetheless smooth leveling in that the substrates to be coated are covered with an even, stripe-free and unbroken film.

EXAMPLES

Percentages and parts are by weight, unless otherwise stated. Sodium lauryl ether sulfate is the reaction product with from 2 to 3 mol of ethylene oxide.

Preparation of polymer dispersions

EXAMPLE 1

A solution of 650 g of water and 7.2 g of sodium bis(2-ethylhexyl) sulfosuccinate (60% strength) was heated under protective gas to a polymerization temperature of 85° C. When the internal temperature reached 70° C., 26 g of a solution of 19.2 g of sodium peroxodisulfate in 240 g of water were added, followed 5 minutes later by the continuous addition with constant stirring of monomer emulsion E1 in the course of 2 h and the remainder of the peroxodisulfate solution in the course of 3.25 h. On completion of the addition the reaction mixture was polymerized at the polymerization temperature for a further 1 h and then cooled down to room temperature. The resulting dispersion was discharged through a narrow mesh filter (pore size 0.12 mm) and the coagulum content was determined by gravimetry and found to be <0.1%. The dispersion was slightly speck and had a surface tension of 34.1 mN/m. The average particle size was about 80 nm (light scattering, ultracentrifuge) and the light transmissivity of a sample diluted to 0.01% by weight was 94%. The dispersion was gradually adjusted in an open vessel with stirring to about pH 8 with aqueous ammonia in the course of 15 min and used in this state for further testing.

| Composition of E1: | |
|---|---|
| 36.0% | 432 g styrene |
| 30.0% | 360 g n-butyl acrylate |

-continued

| Composition of E1: | | |
|---|---|---|
| 20.0% | 240 g | methyl methacrylate |
| 14.0% | 168 g | methacrylic acid |
| | 64.2 g | sodium lauryl ether sulfate (28% strength) |
| | 18.0 g | bis(2-ethylhexyl) sulfosuccinate, sodium salt |
| | 14.4 g | sodium hydroxide solution (25% strength) |
| | 844 g | water |

EXAMPLE 2

To a mixture of 650 g of water and 10.2 g of sodium bis(tridecyl) sulfosuccinate (Aerosol® TR-70 from Cyanamid) (70% strength) was added under reaction conditions as described in Example 1 a monomer emulsion containing as emulsifier not only 64.2 g of sodium lauryl ether sulfate but also 25.7 g of sodium bis(tridecyl) sulfosuccinate (70% strength). The dispersion was nonspecky and low in coagulum (0.8%) and had a surface tension of 28.2 mN/m.

EXAMPLE 3

The preparation was carried out as described in Example 2, except that 21.4 g of sodium lauryl ether sulfate (28% strength) were taken away from the total amount of emulsifier and introduced into 640 g of water as initial charge. The dispersion was low in coagulum (0.3%) and non-specky; the surface tension was 34.0 mN/m.

EXAMPLE 4

The preparation was carried out as described in Example 1, except that the monomer emulsion prepared contained 18 g of sodium lauryl sulfate (1.5%), 18 g of the sodium salt of bis(2-ethylhexyl) sulfosuccinate (1.5%) and 4.8 g of sodium hydroxide solution (25% strength). The dispersion was low in coagulum (0.1%) and non-specky and had a surface tension of 38.7 mN/m.

EXAMPLE 5

The preparation was carried out as described in Example 1, except that the monomer emulsion prepared contained 18 g of sodium bis(2-ethylhexyl) sulfosuccinate (1.5%), 18 g of the sodium salt of $C_{18}$ fatty acid alcohol sulfate (1.5%) and 4.8 g of sodium hydroxide solution (25% strength). The dispersion was low in coagulum (0.1%) and speckiness and had a surface tension of 40.0 mN/m.

EXAMPLE 6

The preparation was carried out as described in Example 1, except that the proportion of sulfosuccinate was doubled (36 g). The dispersion obtained was low in coagulum (0.1%) and non-specky.

EXAMPLE 7

To 400 g of the dispersion of Example 6 were added 12 g of a zinc-containing, ammoniacal styreneacrylic acid addition polymer resin solution (weight ratio 50:50) which had a solids content of 20% and a zinc content of 10%.

EXAMPLE 8

The preparation was carried out as in Example 3, except that the monomer emulsion was prepared with 72 g of disodium-N-octadecylsulfosuccinamate (Aerosol® 18 from Cyanamid, 35% strength) and 42.8 g of sodium lauryl ether sulfate. The dispersion obtained was low in coagulum (0.01%), free of specks and had a surface tension of 46.2 mN/m.

EXAMPLE 9

Example 1 was repeated in modified form. The initial charge comprised a solution of 6.6 g of sodium bis(2-ethylhexyl) sulfosuccinate in 383 g of water, and monomer emulsion E9 was added to it under reaction conditions. The dispersion obtained was free of specks and low in coagulum (0.07%).

| Composition of E9: | | |
|---|---|---|
| 40.0% | 240 g | styrene |
| 30.0% | 180 g | n-butyl acrylate |
| 16.0% | 96 g | methyl methacrylate |
| 14.0% | 84 g | methacrylic acid |
| | 32.1 g | sodium lauryl ether sulfate (28% strength) |
| | 6.0 g | bis(2-ethylhexyl) sulfosuccinate, sodium salt |
| | 0.9 g | calcium hydroxide |
| | 475.0 g | water |

EXAMPLE 10

The preparation was carried out as in Example 1, except for the following differences: the monomer mixture was emulsified with a mixture of 18 g of sodium bis(2-ethylhexyl) sulfosuccinate and 120 g of the sodium salt of n-dodecylbenzenesulfonic acid (15% strength, 1.5%) with the addition of 4.8 g of sodium hydroxide solution (25% strength). The dispersion obtained was low in coagulum (0.15%), readily filterable and free of specks. The surface tension was found to be 38.6 mN/m.

EXAMPLE 11

A dispersion was prepared as described in Example 1, except that the total amount of sulfosuccinate was included in the initial charge and that the monomer emulsion contained only sodium lauryl ether sulfate as emulsifier.

EXAMPLE 12

A dispersion was prepared as described in Example 1 using monomer emulsion E12. The dispersion obtained was low in coagulum (<0.1%) and free of specks. At pH 8 the viscosity was about 63 mPas.

| Composition of E12: | | |
|---|---|---|
| 36.0% | 432 g | methyl methacrylate |
| 30.0% | 360 g | n-butyl acrylate |
| 20.0% | 240 g | styrene |
| 14.0% | 168 g | methacrylic acid |
| | 64.2 g | sodium lauryl ether sulfate (28% strength) |
| | 30.0 g | sodium bis(2-ethylhexyl) sulfosuccinate (60% strength) |
| | 14.4 g | sodium hydroxide solution (25% strength) |
| | 832.0 g | water |

EXAMPLE 13

Example 1 was repeated, except for the following differences: the initial charge comprised an emulsifier solution of 20.0 g of sodium bis(2-ethylhexyl) sulfosuccinate (60% strength, 1% based on monomers) in 700 g of water and monomer emulsion E13 was added to it in the course of 2 h under reaction conditions.

Composition of E13:

| | | |
|---|---|---|
| 35.5% | 426 g | styrene |
| 28.0% | 336 g | n-butyl acrylate |
| 20.0% | 240 g | methyl methacrylate |
| 15.0% | 180 g | methacrylic acid |
| 1.0% | 12 g | acrylamidomethylpropanesulfonic acid |
| 0.5% | 6 g | 1,4-butanediol bis(acrylate) |
| | 64.2 g | sodium lauryl ether sulfate (28% strength) |
| | 22.2 g | bis(2-ethylhexyl) sulfosuccinate, sodium salt (60% strength) |
| | 14.4 g | sodium hydroxide solution (25% strength) |
| | 880.0 g | water |

COMPARATIVE EXAMPLE A

Example 1 was repeated with the exclusive use of sodium bis(2-ethylhexyl) sulfosuccinate (3.6%) as emulsifier and 2.4 g of sodium hydroxide solution (25% strength). The polymer dispersion obtained was free of specks but lacked stability and was rich in coagulum (12%).

COMPARATIVE EXAMPLE B

The dry-bright emulsion A of (2) was prepared.

COMPARATIVE EXAMPLE C

Example 1 of (3) was repeated.

COMPARATIVE EXAMPLE D

Comparative Example A of (3) was repeated.

COMPARATIVE EXAMPLE E

Example 1 of (1) was repeated except that the polymer composition used was that of Example E1 of the present invention and the emulsifier used was sodium lauryl ether sulfate exclusively.

Table 1 shows the characteristic data of the dispersions obtained.

TABLE 1

Characteristic data of dispersions obtained

| Ex. No. | pH | Light transmissivity of a 0.01% aqueous solution [%] | Surface tension (Lauda ring tensiometer, 20° C.) [mN/m] | Viscosity (efflux time Ford cup, 4 mm) [sec] | Minimum film-forming temperature (DIN 53785) [°C.] |
|---|---|---|---|---|---|
| 1 | 4.3 | 94 | 34.1 | 15 | 59 |
| 2 | 3.6 | 65 | 28.2 | — | — |
| 3 | 4.2 | 95 | 34.0 | 15 | 58 |
| 4 | 2.1 | 94 | 38.7 | 13 | 50 |
| 5 | 2.1 | 90 | 40.0 | 13 | 60 |
| 6 | 4.2 | 94 | — | 15 | 60 |
| 7 | — | — | — | 15 | 57 |
| 8 | 4.6 | 94 | 46.2 | 15 | 47 |
| 9 | 4.5 | 92 | — | — | — |
| 10 | 2.1 | 95 | 38.6 | 13 | 52 |
| 11 | 4.1 | 90 | 31.4 | 13 | 60 |
| 12 | 3.6 | 93 | — | 15 | 51 |
| 13 | 2.5 | 95 | — | 15 | 62 |
| A | 2.3 | 94 | — | 14 | 58 |
| B | 1.9 | 95 | 45.5 | 12 | 59 |
| C | 2.0 | 74 | 33.0 | 27 | 53 |
| D | 1.8 | 51 | — | 28 | 54 |
| E | 2.1 | 96 | — | 15 | 60 |

Application tests

The polymer dispersions prepared and neutralized to pH 8 were each processed according to the following formulation into a floor care polish which, after all the ingredients had been mixed together, was stirred for 1 hour:

| | |
|---|---|
| Polymer dispersion of Ex. 1–15 or A | 40 parts |
| Dispersion of an oxygen-containing polyethylene wax (Poligen ® WE1) | 8 parts |
| Ethylene glycol monomethyl ether | 5 parts |
| Tributoxyethyl phosphate | 1.5 parts |
| Water | 45.5 parts |

There now follows a description of the laboratory tests on the formulations and their assessments under DIN 53230 on a scale ranging from 5 (excellent) to 1 (very poor).

1) Gloss

An unused PVC tile (size 30×50 cm, type Dessin weiß 1310 from Dynamit Nobel) was cleaned with alcohol an d then coated twice with a total amount of 15 ml of formulation/m². The coating was applied in strips by means of a 2 inch pure bristle hair brush. The gloss was measured with a Mikro-TRI-gloss meter (angle of measurement 85°°C.) from BYK-Gardner, and the reported figure represents the arithmetic mean of 6 measurements at different points on the coating.

2) Traffic resistance and soilings

The coated and dried tiles (as per item 1) were laid on the floor of a room with an average daily pedestrian traffic frequency of about 500–600. The tiles were assessed after 3 weeks.

3) Spreading

An unused PVC table covering tile (size 15×35 cm, type unigrfin No. 1911 from Dynamit Nobel) was cleaned with alcohol and then coated twice as described under item 1 with a total amount of 15 ml of formulation/m². Thereafter the formulation was applied crosswise. After the film had formed and dried, the quality of spreading was assessed visually by looking out in particular for (crosswise) stripes or cloud formations.

4) Tackiness

An unused PVC floor covering tile (size 8×8 cm, type unigrün No. 1911 from Dynamit Nobel) was cleaned with alcohol, weighed and coated twice as described under item 1 with a total amount of 15 ml of formulation/m² and then dried at 40° C. in a drying cabinet for 30 minutes. The dry tile was uniformly besprinkled with 500 mg of quartz sand (finely grained, washed and calcined) and left under a load of 2 kg for one minute. Nonadherent quartz sand was carefully shaken off and the PVC was reweighed. The difference indicates the amount of adherent quartz sand and was used to determine a relative index of tackiness. A high index indicates a coating of little tackiness.

5) Water resistance

An unused piece of linoleum (size 17×35 cm, type Uniwalton No. 50 green, thin quality) was coated twice with a total amount of 15 ml of formulation/m² and then dried for 2 h. A piece of white filter paper, 2.5 cm² in size, was moistened with 0.2 ml of distilled water and placed on top of the coated tile, pressed down and left to dry. The degree of redispersal of the polymer film due to the treatment with water, evidenced by graying at the surface, was assessed comparatively.

6) Alcohol resistance

The test was carried out in the same way as the water resistance test, except that the coating was moistened with 0.05 ml of a 60% strength ethanol/water mixture and then allowed to dry.

7) Wet wipe resistance

An unused piece of linoleum (size 17×35 cm, type Uniwalton No. 50 green, thin quality) was twice coated with a total amount of 15 ml of formulation/m² and dried for 24 h. The wet abrasion resistance test was carried out on a Gardner straight line washability and abrasion machine from Gardner Lab. The machine rubbed a viscose sponge, moistened with distilled water as test mixture, over the coated linoleum for 1000 cycles (forward and backward strokes). On the polymer film wet wipe resistance scale 5 denotes an unchanged film and 1 denotes very poor resistance.

8) Detergent resistance

The test was carried out as under item 7, except that the test mixture was a commercial soap-containing floor cleaner (Sofix ® from Thompson) diluted with distilled water in a weight ratio of 1:10.

9) Stick and slip friction

An unused PVC tile (size 30×50 cm, type Dessin weiß 1310 from Dynamit Nobel) was cleaned with alcohol and then coated twice with a total amount of 15 ml of formulation/m². The stick and slip friction on this coating was measured with a WWTG machine from Ing. E. Becker. The reported value is the arithmetic mean of two measurements.

10) Removability after aging

An unused piece of PVC, size 17×35 cm, (type Milopan braun 4806 from Dynamit Nobel) was twice coated with 15 ml/m² of formulation and aged for 4 weeks at 50° C. in a through-circulation cabinet. Thereafter the Gardner machine (cf. item 7) was used to test the removability of the coating. The assessments were made after 50 or 100 cycles. The test solution used for this purpose was a commercial base cleaner (Rax ® from Erdal or Sigofix ® from Henkel). On the assessment scale 5 denotes completely removed coatings and 1 coatings which were unaffected.

Table 2 shows the results of the application tests.

as alcohol radical, a methacrylic ester having a primary or secondary $C_5$–$C_{18}$-alkyl group, which may be interrupted by oxygen atoms, as alcohol radical, or a mixture thereof, B) from 15 to 50% by weight of an acrylic or methacrylic ester having a tertiary $C_4$–$C_8$-alkyl group as alcohol radical, an acrylic or meth-acrylic ester having a $C_6$–$C_2$-alcohol radical that is an alicyclic or aromatic group or contains an alicyclic or aromatic group, a meth-acrylic ester having a primary or secondary $C_1$–$C_4$-alkyl group as alcohol radical, acrylo- or methacrylonitrile, acryl- or methacrylamide, a vinyl ester of a $C_1$–$C_8$-carboxylic acid, or a mixture thereof, C) from 10 to 50% by weight of one or more $C_8$–$C_{12}$-aromatic vinyl compounds, D) from 8 to 20% by weight of an olefinically unsaturated $C_3$–$C_5$-mono- or $C_4$–$C_8$-dicarboxylic acid or anhydride or a mixture thereof, and E) from 0 to 5% by weight of further copolymerizable monomers having functional groups in the presence, based on the monomer mixture of A to E, of an emulsifier mixture of (a) from 0.5 to 7% by weight of one or more anionic emulsifier of the formula I

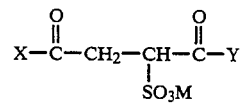

where

M is an alkali metal or ammonium which may be substituted by from one to four $C_1$–$C_4$-alkyl or $C_1$–$C_4$-hydroxyalkyl groups, and X and Y are identical or different and each is O—$(C_nH_{2n}O)_m$—R, OM or NHR, wherein at least one of the radicals X and Y is O—$(C_nH_{2n}O)_m$—R

TABLE 2

| | | | | | | | | | 9) Stick and slip friction coefficients | 10) Removability | |
|---|---|---|---|---|---|---|---|---|---|---|---|
| Ex. No. | 1) Gloss | 2) Traffic resistance [Rating] | 3) Spreading [Rating] | 4) Tackiness [Index] | 5) Water resistance [Rating] | 6) Alcohol resistance [Rating] | 7) Wet wipe resistance [Rating] | 8) Detergent resistance [Rating] | | 50 cycles [Rating] | 100 cycles [Rating] |
| 1 | 53 | 2 | 5 | 50 | 5 | 4 | 3.5 | 5 | 0.38/0.65 | 2.5 | 4.5 |
| 2 | — | — | 3 | 71 | — | — | — | — | —/— | — | — |
| 3 | 63 | 2 | 5 | 86 | 5 | 4 | 4 | 5 | 0.37/0.30 | 3 | 4.5 |
| 4 | 68 | 3 | 4 | 80 | 5 | 1 | 4.5 | 5 | 0.28/0.20 | 2.5 | 5 |
| 5 | 59 | 2 | 5 | 96 | 5 | 3 | 2.5 | 4.5 | 0.28/0.28 | 3 | 5 |
| 6 | 64 | 3 | 4 | 93 | 3 | 3 | 2 | 2 | 0.30/0.42 | 1.5 | 3 |
| 7 | 68 | 5 | 4 | 91 | 4 | 4.5 | 1.5 | 2 | 0.35/0.48 | 4 | 4 |
| 8 | 65 | 2 | 5 | 80 | 5 | 3.5 | 4 | 4.5 | 0.20/0.20 | 2 | 4.5 |
| 9 | — | — | 3.5 | 82 | — | — | — | — | —/— | — | — |
| 10 | 61 | 3 | 5 | 84 | 5 | 4 | 4 | 5 | 0.40/0.50 | 2.5 | 5 |
| 11 | 60 | 4 | 3 | 77 | 4 | 3.5 | 4 | 5 | 0.33/0.45 | 4 | 4.5 |
| 12 | 42 | 3 | 5 | 99 | 5 | 4 | 2 | 5 | 0.33/0.28 | 3 | 5 |
| 13 | — | — | 4 | 116 | — | — | — | — | —/— | — | — |
| A | — | — | 4 | 32 | — | — | — | — | —/— | — | — |
| B | 64 | 1 | 1.5 | 79 | 3.5 | 4.5 | 4.5 | 5 | 0.40/0.25 | 1 | 1 |
| C | 46 | 2.5 | 3 | 104 | 2 | 4.5 | 2 | 1 | 0.30/0.30 | 5 | 5 |
| D | 59 | 2 | 3.5 | 103 | 1.5 | 3.5 | 2 | 2 | 0.38/0.35 | 4.5 | 5 |
| E | 59 | 3.5 | 2 | 100 | 4 | 4 | 5 | 3.5 | 0.47/0.28 | 5 | 5 |

We claim:

1. A coating agent comprising an emulsion polymer obtained by free radical emulsion polymerization of a monomer mixture of A) from 15 to 60% by weight of an acrylic ester having a primary or secondary $C_1$–$C_{18}$-alkyl group, which may be interrupted by oxygen atoms, or NHR, R is $C_6$–$C_{18}$-alkyl, $C_6$–$C_{18}$-alkenyl, $C_5$–$C_8$-cycloalkyl, ($C_1$–$C_{12}$-alkyl)aryl or phenyl, n is from 2 to 4, and m is from 0 to 30, (b) from 0.1 to 10 parts by weight per part by weight of (a) of at least one further different anionic emulsifier, and (c) from 0 to 10 parts by weight per part by weight of (a) of one or more nonionic emulsifiers.

2. A coating agent as claimed in claim 1, wherein the emulsion polymer is obtained by free radical emulsion polymerization of a monomer mixture of
  A) from 15 to 60% by weight of n-butyl acrylate,
  B) from 15 to 50% by weight of methyl methacrylate,
  C) from 10 to 50% by weight of styrene,
  D) from 8 to 20% by weight of acrylic acid, methacrylic acid or a mixture thereof, and
  E) from 0 to 5% by weight of further copolymerizable monomers having functional groups.

3. A coating agent as claimed in claim 1, wherein the emulsion polymer is obtained by free radical emulsion polymerization in the presence of an emulsifier mixture containing as emulsifier component (a) the alkali metal salt of a di($C_6$–$C_{18}$-alkyl) α-sulfosuccinate or the dialkali metal salt of an N—($C_6$–$C_{18}$-alkyl)sulfosuccinamate.

4. A coating agent as claimed in claim 1, wherein the emulsion polymer is obtained by free radical emulsion polymerization in the presence of an emulsifier mixture containing as emulsifier component (b) alkali metal or ammonium salts of $C_6$–$C_{18}$-alkyl, ($C_6$–$C_{18}$-alkyl)aryl or α-methyl ester sulfonates, sulfates or polyether sulfates and the corresponding phosphates or phosphonates or $C_6$–$C_{18}$-alkyl diphenyl oxide disulfonates or mixtures thereof.

5. A process of preparing an emulsion polymer suitable for use as coating agent, which comprises polymerizing a monomer mixture of
  A) from 15 to 60% by weight of an acrylic ester having a primary or secondary $C_1$–$C_{18}$-alkyl group, which may be interrupted by oxygen atoms, as alcohol radical, a methacrylic ester having a primary or secondary $C_5$–$C_{18}$-alkyl group, which may be interrupted by oxygen atoms, as alcohol radical, or a mixture thereof,
  B) from 15 to 50% by weight of an acrylic or methacrylic ester having a tertiary $C_4$–$C_8$-alkyl group as alcohol radical, an acrylic or meth-acrylic ester having a $C_6$–$C_2$-alcohol radical that is an alicyclic or aromatic group or contains an alicyclic or aromatic group, a meth-acrylic ester having a primary or secondary $C_1$–$C_4$-alkyl group as alcohol radical, acrylo- or methacrylonitrile, acryl- or methacrylamide, a vinyl ester of a $C_1$–$C_8$-carboxylic acid, or a mixture thereof,
  C) from 10 to 50% by weight of one or more $C_8$–$C_{12}$-aromatic vinyl compounds,
  D) from 8 to 20% by weight of an olefinically unsaturated $C_3$–$C_5$-mono- or $C_4$–$C_8$-dicarboxylic acid or anhydride or a mixture thereof, and
  E) from 0 to 5% by weight of further copolymerizable monomers having functional groups by a free radical polymerization in the presence, based on the monomer mixture of A to E, of an emulsifier mixture of (a) from 0.5 to 7% by weight of one or more anionic emulsifier of the formula I

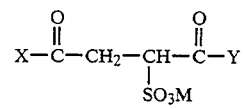

where
  M is an alkali metal or ammonium which may be substituted by from one to four $C_1$–$C_4$-alkyl or $C_1$–$C_4$-hydroxyalkyl groups, and
  X and Y are identical or different and each is O—$(C_nH_{2n}O)_m$—R, OM or NHR, wherein at least one of the radicals X and Y is O—$(C_nH_{2n}O)_m$—R or NHR, R is $C_6$–$C_{18}$-alkyl, $C_6$–$C_{18}$-alkenyl, $C_5$–$C_8$-cycloalkyl, ($C_1$–$C_{12}$-alkyl)aryl or phenyl, n is from 2 to 4, and m is from 0 to 30, (b) from 0.1 to 10 parts by weight per part by weight of
(a) of at least one further different anionic emulsifier, and (c) from 0 to 10 parts by weight per part by weight of
(a) of one or more nonionic emulsifiers.

6. A smooth leveling coating agent formulation for coating hard and soft surfaces, containing in addition to customary constituents for this purpose from 1 to 50% by weight, based on the polymer content, of one or more coating agents as claimed in claim 1.

7. A method for coating hard and soft surfaces with smooth leveling coating agent formulations which comprises using coating agents as claimed in claim 1.

8. Dry-bright emulsions for floor and shoe care containing in addition to customary constituents for this purpose from 1 to 50% by weight, based on the polymer content, of one or more coating agents as claimed in claim 1.

9. A method for floor and shoe care with dry-bright emulsions which comprises using coating agents as claimed in claim 1.

* * * * *